United States Patent [19]
Feldstein

[11] Patent Number: 5,585,209
[45] Date of Patent: Dec. 17, 1996

[54] BIPOLAR LEAD/ACID BATTERIES

[76] Inventor: Robert S. Feldstein, 1396 Park La., Pelham, N.Y. 10803

[21] Appl. No.: 360,077

[22] Filed: Dec. 20, 1994

Related U.S. Application Data

[63] Continuation of Ser. No. 74,360, Jun. 10, 1993, abandoned.

[51] Int. Cl.$^6$ ............... H01M 10/18; H01M 4/56; H01M 2/12
[52] U.S. Cl. ............... 429/210; 429/53; 429/225; 429/228
[58] Field of Search ............... 429/210, 53, 225, 429/228; 29/623.5; H01M 10/18

[56] References Cited

U.S. PATENT DOCUMENTS

| | | | |
|---|---|---|---|
| 2,471,781 | 5/1949 | Schmidt | 429/210 |
| 4,008,099 | 2/1977 | Lindstrom | 429/210 X |
| 4,188,464 | 2/1980 | Adams et al. | 429/210 |
| 4,637,970 | 1/1987 | Yeh et al. | 429/210 X |
| 4,939,051 | 7/1990 | Yasuda et al. | |

FOREIGN PATENT DOCUMENTS

| | | | |
|---|---|---|---|
| 58-198860 | 11/1983 | Japan | 29/2 |
| 59-149652 | 8/1984 | Japan | |

OTHER PUBLICATIONS

Eskra et al, (no month) 1991, Johnson Controls Inc., Paper Re: XA–200.
Iverson, Oct. 1991, *Design News*, Electric Vehicle Race Gathers Momentum.
Publisher and Date Unknown, Fischetti, Here Comes the Electric Car—it's sporty, agressive and clean.
Shuldiner, Sep. 1991, *Popular Mechanics*, New Age EV's.
Allen, Sep. 1991, *Popular Mechanics*, Battery Charges.
Suris, Aug. 1993, *Toronto Star*, Batteries at GM electric car research lab run down fast.

*Primary Examiner*—John S. Maples
*Attorney, Agent, or Firm*—Beveridge, DeGrandi, Weilacher & Young, LLP

[57] ABSTRACT

Bipolar lead/acid batteries are provided, having at least one cored bipolar battery plate. The bipolar battery plate comprises a core element having an active surface at each side thereof, with lead at the negative side and lead oxide at the positive side of the cored battery plate. The core element comprises titanium or other appropriate high barrier height material, at least at each surface thereof which faces the respective lead and lead oxide active surfaces. A molded polymer frame is provided around the bipolar plate, and appropriate negative and positive end plates are provided opposite the outer most positive or negative sides of the battery so as to provide a functioning battery structure. The polymer frame is such that it may be sealed against electrolyte leakage so that the electrolyte is confined within the structure by the battery frames. The battery frame may be vented so as to permit pressurized gas to flow from the battery when the pressure exceeds a predetermined pressure. The assembly of the plates and end plates may be accomplished using suitable bonding techniques for the plastic frame members, including pressure molding, ultrasonic bonding, thermal bonding, or the use of suitable adhesives.

3 Claims, 1 Drawing Sheet

5,585,209

BIPOLAR LEAD/ACID BATTERIES

This is a continuation of U.S. patent application Ser. No. 08/074,360 filed Jun. 10, 1993, now abandoned.

FIELD OF THE INVENTION

This invention relates to methods for fabricating battery plates for use in lead/acid batteries. More particularly, the present invention relates to bipolar lead/acid batteries, where cored plates have active surface areas of lead and lead oxide on opposed sides, and are exposed to sulphuric acid within the battery cell containment. Lead/acid batteries of the present invention may be used as the power source batteries in electric vehicles, or in other circumstances such as standby battery applications.

BACKGROUND OF THE INVENTION

It is said that, in future, automotive transport will look much more closely to, and rely more upon, electrically powered vehicles. Electric vehicles are essentially zero-emission vehicles, which is to say that they are non-polluting at the power consumption point, and it is intended that current shortcomings of electrical vehicles should be overcome as quickly as possible. Among those shortcomings is the fact that batteries to be used for electric vehicles may comprise as much as 20% to 30% of the weight of the vehicle. That means, in turn, that the power delivered by the batteries must be such that it can move not only the vehicle and its passengers, but the weight of the batteries themselves. Moreover, even in city and light highway traffic conditions, an electric vehicle must be expected to accelerate in a manner similar to a conventional vehicle powered by an internal combustion engine, which means either that there must be excess battery capacity on board the vehicle to provide fast current delivery for vehicle acceleration, or that the batteries must be designed with a high ratio of active material surface to volume so as to be able to provide high power densities. Such demands may be similar to cranking power requirements in ordinary vehicles, but the demands may occur much more frequently and be of longer duration in each instance.

Moreover, electrically powered vehicles must have batteries that are capable of being recharged very quickly. While battery recharging is outside the scope of this invention, it is evident that just as the batteries must be designed so as to be able to deliver high current, quickly, so also must they be designed to absorb high recharging current, quickly. Still further, the choice of batteries in various experimental and low-production electric vehicle programs currently under way throughout the world has demanded consideration of various battery types, operating at various voltage levels.

Among the battery types presently under consideration for use in electric vehicles are nickel-cadmium batteries, which however are very expensive, environmentally undesirable, and tend to self-discharge. Moreover, nickel-cadmium batteries may exhibit a memory effect, in that they must be substantially fully discharged before they are recharged; otherwise, such batteries may develop a rate-limited "memory" phenomenon whereby they tend to lose their usable rate delivery capabilities if they are recharged when only partially discharged.

Nickel-iron batteries are also being considered, but it must not be overlooked that they were used at least as early as the Second World War to power submarines when running under water. Moreover, nickel-iron batteries tend to produce hydrogen gas, requiring very special ventilation, and creating explosive conditions. Still further, they are very heavy.

Even rechargeable alkaline manganese dioxide batteries are now being considered for electric vehicles. Bundles of very small cells are being assembled into batteries so as to provide high current delivery and high current recharge acceptance characteristics, which overcomes a shortcoming of such batteries in commercial cell sizes because they are not generally capable of high current delivery or high current recharge. Batteries made from rechargeable alkaline manganese dioxide cells also overcome the shortcomings of similar nickel-cadmium batteries in that they do not have any memory effects, and are not nearly so likely to exhibit overheating characteristics, especially during any recharge which is not precisely controlled. However, rechargeable alkaline manganese dioxide batteries are expected to be quite expensive in terms of the power density capable of being produced, and to have unacceptable cycle life.

Sodium-sulphur batteries will provide about three times the range of lead/acid batteries having the same weight. However, sodium-sulphur batteries must be maintained at temperatures of at least 315° C. in order to produce electricity, making them extremely hazardous in use. Moreover, to maintain sodium-sulphur batteries at those high temperatures requires extremely good insulation plus electrically powered heaters—which is wasteful of stored electrical energy in the battery, as well as making a requirement for external power when the vehicle is parked.

Accordingly, the automotive industry has generally decided to maintain its reliance on lead/acid batteries as a principal power source for electric vehicles, for a variety of reasons. First, lead/acid battery technology is well known and accepted by the public, since most automotive batteries are currently lead/acid batteries. Lead acid batteries are also well accepted as traction batteries for industrial vehicles such as fork lift trucks and the like, and for recreational vehicles such as golf carts. Moreover, lead/acid batteries can be designed to be essentially non-polluting if they are closed or sealed batteries operating in a gas recombinant mode. Such batteries require very little maintenance, if any. Still further, even the disposal of lead/acid batteries is less ecologically sensitive an issue than previously, because techniques now exist whereby substantially all lead in such batteries may be recovered and recycled. This reduces, if not virtually eliminates, landfill and ground water contamination problems.

Moreover, in general it is possible to design lead/acid batteries that are capable of delivering and receiving relatively high current densities, so as to meet the requirements of electric vehicle acceleration, regenerative braking, and fast charging. However, lead/acid batteries still have a number of problems to overcome, including the problems of energy density, and the unfortunate tendency of lead/acid batteries to lose active material from their plates—particularly at high current densities. If active material is lost from a plate, then obviously the current capacity of the battery will be reduced; and moreover, there exists a strong possibility that active material detaching from the plates may result in short-circuited cells.

All of the major automobile manufacturers of the world are devoting very substantial sums of money to the development of electric vehicles. Indeed, some of those electric vehicles are hybrids, which use small auxiliary power sources—such as a small gasoline engine—whose purpose is to charge the batteries of the vehicle—especially during long or extended trips taken by the vehicle. Unfortunately, at least in California, such vehicles may not be accepted after 1998 because it is mandated that after 1998 at least 2% of the vehicles sold in California by any manufacturer who sells more than 5,000 vehicles annually in that state must be zero-emission vehicles. That means that hybrid vehicles, while attractive, may only be a short-term solution towards fully electric vehicles—with the possible exception of hydrogen powered vehicles.

Regrettably, this once again raises the problem of the capability of lead/acid batteries to continually absorb deep discharge without degrading, especially over many cycles having rapid battery recharging.

Certain bipolar lead/acid batteries have been developed by Jet Propulsion Laboratory, in association with Johnson Controls Inc., particularly for the XA-100 and XA-200 hybrid electric vehicle projects. In a paper published in 1991 by Johnson Controls Inc., "The XA-200: Proposed Hybrid Electric Vehicle Using the Bipolar Lead/Acid Battery" by M. Eskra et al, bipolar lead/acid batteries are discussed. Hybrid vehicles incorporating the described batteries are driven using a three-phase AC induction motor and an inverter controller system, carried in the frame of a conventional automobile but replacing its engine. According to the Eskra et al paper, it was found in early experimentation that the lead/acid batteries needed to be optimized so as to operate under high power conditions, and that the lead/acid batteries were too large and too heavy. The battery requirements were for the battery to deliver 60 kW for 20 seconds, and to have about 7 kWh total energy capacity. The weight allowed is 365 Kg, thus providing for energy density of about 19.2 Whr/Kg. The battery voltage is now expected to be in the range of about 200 volts; and the cut-off voltage for the battery is set at 100 volts, after which the battery is recharged.

The Eskra et al paper was given at the ISATA conference, held in Florence, Italy, during May 1991. The paper describes a bipolar battery having positive and negative active surfaces that are mounted back-to-back on an electrically conductive substrate, with separators placed between the opposed electrode surfaces of opposite polarity. As with any bipolar battery, the current path is straight through the battery, and the voltage increases with each cell that the current passes through. The bipolar battery is made of a stack of bipolar plates, and the stack is created and sealed by thermally welding together the plastic edges that are formed on each of the bipolar plates. It must be noted that each plate consists of a reinforced plastic substrate, with two thin lead grids on either side of the substrate, and having active material pasted into the grids. Electric current is carried through the reinforced plastic substrate by physical connections that are made between the thin lead grids which are on either side. The battery operates in a sealed, gas recombinant mode, with oxygen that is produced at the positive electrode or positive side of each plate diffusing to the negative electrode or side of the adjacent plate, where it is reduced.

It should be noted, as well, that lead/acid batteries in keeping with the present invention may find usefulness in other circumstances than electrically powered vehicles. In particular, lead/acid batteries in keeping with the present invention will provide suitable high levels of energy density and power density, long cycle life and fast recharging rates, all of which are critical or particularly attractive for utilization of the batteries in electric vehicles. Moreover, because of those characteristics, it will also follow that for given parameters any lead/acid batteries of the present invention may have a smaller footprint or volume, lower weight, and longer float life, all of which are critical or at least desirable for circumstances such as standby power applications. Such uses may include uninterruptable power supplies, and other standby and/or critical load power systems.

It was noted above that the Eskra et al paper describes bipolar lead/acid batteries that are capable of providing energy densities of about 19.2 Whr/Kg. Bipolar lead/acid batteries in keeping with the present invention will provide at least three times that energy density—up to 110 Whr/Kg.

Indeed, a variety of related inventions that are all directed towards battery plates for lead/acid batteries are described or at least referenced, below. Several issues, therefore, to be discussed include the provision of battery plates for lead/acid batteries, wherein an increased exposed active surface area for each plate, with respect to its projected area, will be provided. Thus, battery plates in keeping with the present invention are more capable of providing high current rates, from which it follows that battery plates as provided herein will exhibit a high active material surface to volume ratio. Conversely, such battery plates provide a lower density per unit of active area of the battery plates. The exposed active surface area of the plate will be at least 150% of its projected area.

Reference will be made herein to the provision of battery plates whereby various surface treatment steps may be taken to provide for the increased active surface area. Thus, steps are described to provide the placement of lead, and the manner in which the lead surface may be worked or machined so as to provide an increased active surface area.

Moreover, the present discussion is also directed to methods whereby the positive side of bipolar battery plates may be provided by oxidation of a prepared lead surface. There is therefore a fully prepared positive plate surface that is provided, and from that it follows that a formed battery will be provided when opposed prepared negative lead surface, together with the appropriate confinement structures, electrolyte, etc., are assembled. Thus, a manufactured battery is immediately ready to be placed in service without the necessity for post-assembly formation.

Other aspects to be at least referenced below include the provision of cored battery plates for bipolar lead/acid batteries. By providing a cored battery plate, where the core may be such as titanium, copper, chromium steel, or even silver, the weight of the battery will be reduced.

Still further, the teachings of the present invention, as they may be applied to bipolar batteries, provide for batteries having high rate, and high energy capacity to volume ratio characteristics. Moreover, it will be evident that methods of surface preparation and methods of oxide formation discussed below, are applicable to bipolar plates.

The present invention provides battery plates for lead/acid batteries, and in particular it will provide bipolar plates for lead/acid batteries. Moreover, the present invention will provide bipolar battery plates which are quite thin as to their lead constituent, but which comprise little additional structure which would otherwise add weight without providing either structural integrity or current density capabilities. Of even greater significance is the fact that bipolar battery plates that are fabricated according to the methods of the present invention will not exhibit any tendency to delaminate.

It must not be overlooked that, in a bipolar battery, each plate has a negative side and a positive side—active layers of lead and lead oxide, respectively—which are electrically connected through the physical core which separates the two sides of the single plate. Previously, bipolar plates for lead/acid batteries generally comprised a polymer or other plastic, non-conductive core, through which conductive pins or rivets electrically connected the positive side of the bipolar plate to the negative side of the bipolar plate. Current flows through the plate from the negative side to the positive side, not out the plate at the edge thereof as in a conventional stacked battery cell. By the present invention, a core is provided that is highly electrically conductive and, as well, is thermally conductive so as to preclude the possibility of unwanted temperature gradients developing within the battery.

However, the metallic cores provided by the present invention must be such that there is absolutely no likelihood of any pin hole or other path developing through the core whereby electrolyte may be permitted to flow from one side of the plate to the other. Because of their bipolar structure, each plate in a bipolar battery defines a cell, with voltage in the battery being cumulative according to the number of cells that are placed in the battery. However, if a pin hole develops whereby electrolyte from one side of a plate is allowed to flow to the other side of the plate, then adjacent cells—the cells at either side of the plate—are electrically shorted because the electrolyte in those two cells would then be in equilibrium. It is therefore important that the metallic cores that are provided by the present invention are structurally integral in all conditions.

When a bipolar plate is assembled and put into use, then there is a possibility that, especially on recharge conditions, gas may be produced within the cell. Each cell of a bipolar battery which is assembled according to the present invention should be vented. However, because bipolar batteries in keeping with the present invention are assembled using moldable polymer edge frames on each plate, the provision of a vent for each cell is easily accomplished, as is described hereafter.

OBJECTS OF THE INVENTION

Accordingly, it is an object of the present invention to provide methods for fabricating cored battery plates for use in bipolar lead/acid batteries, where each cored battery plate has a thin layer of lead at each side of the core. The lead at one side of the plate is at least partially oxidized to form a lead oxide surface because that side of the bipolar battery plate is to be the positive side. The lead surfaces of the negative side of the bipolar plate may be surface treated so as to form a plurality of depressions therein. The positive side is treated so as to increase the exposed active surface area thereof, ideally at least to 150% of the projected area of the plate.

A further purpose of the present invention is to provide a cored bipolar plate where the core element may be any suitable conductive metal, against which thin layers of lead may be formed prior to their being surface treated and oxidized at the respective negative and positive sides thereof.

Still further, the present invention provides a variety of steps whereby the interface of lead with the core material is so secure that there is no likelihood of delamination of the lead away from the core.

A further object of the present invention is to provide a bipolar plate where the core element provides titanium surfaces, or other appropriate surfaces such as high chrome steels, on each side of the core element, against which thin layer of lead may be formed prior to surface treatment and oxidation of the respective negative and positive sides thereof. It follows, therefore, that the present invention provides a variety of steps whereby the titanium/lead interface is so secure that there is no likelihood of delamination of the lead away from the titanium.

The present invention also provides a cored plate for bipolar lead/acid batteries, where the inner core of the core element may be titanium, or it may be copper, beryllium-copper, chrome vanadium steel, or even silver, having a titanium cladding. Particularly, if the core element is copper or other metal that is titanium clad, the cost of the cored plate may be effectively controlled and be economical.

Titanium is selected as a core surface material of choice because it demonstrates a high work function barrier height material, notwithstanding the possibility of passivation which may effectively isolate the titanium. However, the loss of effective core area and micro-delamination which may come about as a consequence of passivation is negligible because of the poor corrosion propagation that may occur along a graded junction between lead and titanium. It should be noted, for example, that the Jet Propulsion Laboratory batteries noted above use an essentially non-conductive polymer core, rather than a conductive core, for their battery plates, but the battery performs well. Moreover, it has been found that a high tin content of perhaps 1% or slightly more of the lead which is immediately adjacent to the titanium interface will further control and essentially preclude the possibility of passivation.

Finally, the present invention provides bipolar lead/acid batteries which will generally exhibit higher current carrying capabilities than has been previously attainable.

DESCRIPTION OF THE PREFERRED EMBODIMENTS

Figure 1:
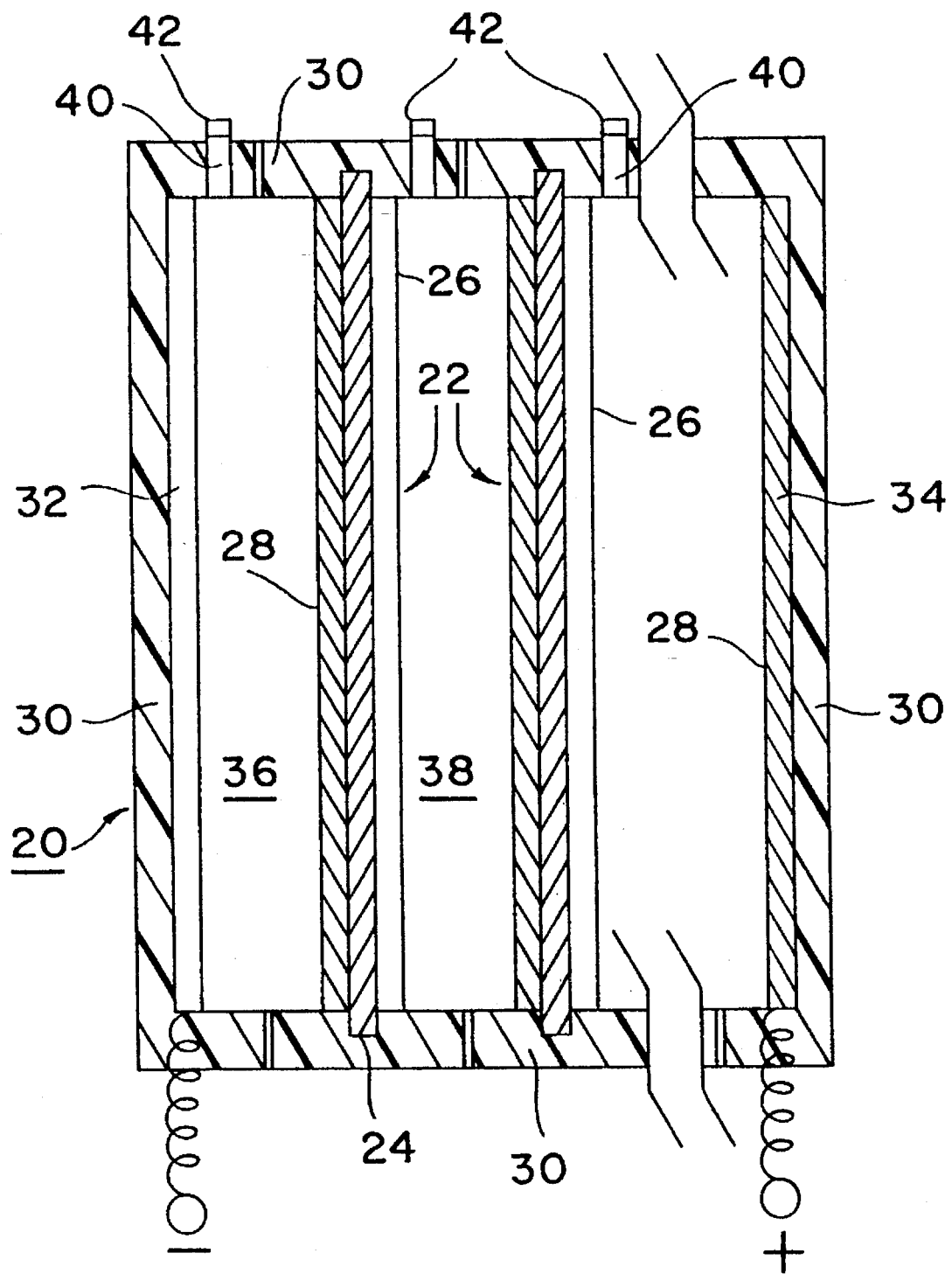
FIG. 1 represents a cored bipolar lead/acid battery according to this invention.

Battery plates are fabricated in keeping with the present invention for use in bipolar lead/acid batteries. Each battery plate will exhibit a high active surface area when compared with its projected area. The principal active constituent of each battery plate that is fabricated in keeping with the present invention is elemental lead or lead oxide, depending on which side of the plate is the negative side or the positive side.

Reference is made to four patents co-pending filed of even date herewith, each in the name of the present inventor. The first is in respect of an invention entitled "METHODS FOR FABRICATING BATTERY PLATES FOR LEAD/ACID BATTERIES", now U.S. Pat. No. 5,379,502 and relates particularly to methods by which thin layers of lead may be produced, formed, and surface treated so as to provide a battery plate having an exposed active surface area of the discrete plate unit which is at least 150% of its projected area. That application also provides methods for oxidizing lead surfaces in situ, whereby a pre-formed positive plate is provided without the necessity for post-forming the battery after it has been assembled.

The second is entitled CORED BATTERY PLATES FOR LEAD/ACID BATTERIES, now U.S. Pat. No. 5,339,873 and as its title indicates that application is directed to cored plates for lead/acid batteries. A number of the principles of the present invention are employed, insofar as there is a requirement in bipolar batteries to provide a cored plate. However, of course, in a bipolar plate opposite surfaces of the same plate have the opposite polarity, negative on one side and positive on the other, so that in a bipolar battery one side of the cored plate will have an active lead surface, whereas the other side of the cored plate will have an active lead oxide surface. Thus, the purpose of that application is to provide cored plates—especially battery plates—in general, whereby surfaces of other materials such as lead or lead oxide may be adhered to a metallic core without fear of delamination during active use. Then, when each side of the plate is different than the other, they may be used in the bipolar batteries of the present invention.

The remaining two are entitled "INTEGRAL BATTERY ELECTRODE STRUCTURE FOR LEAD/ACID BATTERIES", now U.S. Pat. No. 5,411,821 and "INTEGRAL ELECTRODE STRUCTURES HAVING FILLER ADDITIVES", U.S. patent application Ser. No. 08/074,747. The first of those other applications relates to improved battery electrode structures which are otherwise as are generally found in the prior art at the time that these applications are filed. Certain of the ion bombardment techniques described herein find relevance also in the teachings of that application. The fourth application contemplates battery electrode or other electrode structures such as for fuel cells or electrolysis electrodes where a filler additive material is included in the metal electrode structure so as to provide added strength to the structure. The teachings of that invention may be useful in carrying out the present invention at the stage where additional substantially pure active surface material is placed on the cored plate surface, and especially where it is desired that there be increased mechanical ruggedness or increased resistance to corrosion of the active surface of the cored battery plate.

It has also been contemplated in U.S. Pat. No. 5,248,475, also by the present inventor, that a thin layer of lead may be produced such as on a substrate of lead calcium or otherwise by a process identified as alloy migration sintering. The process comprises steps whereby a low melting point alloy which essentially comprises lead together with an alloying agent—usually tin—or a tin-coated lead powder, may be sintered. This is accomplished by forming a eutectic composition of the lead on the substrate, from which a sintered lead structure may be obtained.

In its ideal sense, because it functions as a current conductor—either as a current source or a current collector—an ideal battery plate should have negligible electrical resistance. Moreover, the ideal battery plate should have a very high ratio of exposed active surface area to its gross or projected area. Still further, of course, the bond between the chemically active material at each surface of a cored bipolar battery plate and any underlying material that functions as its physical support and/or its current collector, should maintain both its mechanical strength and its electrical conductivity—with no localized high resistivity under varying conditions including severe mechanical and/or electrical stress conditions.

Typically, the plate of a prior art bipolar lead/acid battery comprises a polymer or other non-conductive core, through which conductive pins extend from one side of the core to the other. However, those pins provide for focused areas where current will flow through the battery plate, and if there is any electrical resistance in those pins then there may be localized heating in the area of the pins. Moreover, such polymer cored bipolar plates are not such that they may easily give up electrical energy in high discharge current conditions—or easily absorb electrical energy in high charge current conditions. Those difficulties may be overcome by providing a high conductivity metallic core for bipolar battery plates in keeping with this invention.

For any battery plate, if there is an increased surface area of the active material of the plate, then there is a greater opportunity for energy transfer at the solid/liquid electrolyte/ gas interface. That means, of course, that the battery will give up electrical energy as current, or accept electrical energy as current, at higher current rates. The matter of surface treatment to increase the surface area is fully described in the co-pending U.S. Pat. No. 5,339,873 relating to METHODS FOR FABRICATING BATTERY PLATES FOR LEAD/ACID BATTERIES.

In keeping with the principles discussed about, it is an intended design criterion of the present invention that the active material of the plates should be thin. This is the case whether the active material is on the negative plate side or positive plate side of the bipolar electrode. As discussed, any attempt of prior art batteries to incorporate thin plates has, however, compromised the ruggedness of the battery and therefore its life. Moreover, an increased surface area will provide for a lower current density.

When the concept of metallic cored bipolar battery plates is considered, as in the present application, it must be recognized that what is being discussed is the provision of a thin layer of lead over a metallic core or substrate, in the first instance. Essentially, there are a number of means by which the thin layer of lead may be produced. They include the simple steps of casting a thin film of lead, or extruding a thin film of lead. However, thin films of lead are, themselves, difficult to handle, so a substrate such as a very thin sheet of lead calcium or lead antimony might be used. Indeed, other light weight materials which, themselves, would be substantially chemically inert in a battery might be used as a substrate. It is recognized that placing lead layers on a substrate is relevant to cored plates in general, as well as with regard to bipolar battery plates.

In any event, whenever a substrate or core is to be used for the preparation of the plate, its surface will be prepared, at least by precleaning. As discussed hereafter, lead may be ion implanted into the prepared substrate surface, followed by plasma arc spraying. Control of the acceleration voltages of the plasma are will be carried out using conventional techniques. Additional lead might, in fact, also be placed such as by sputtering lead onto the then placed first lead layer, or by co-extrusion.

Still further, the lead may be placed onto the prepared surface of a substrate using ion beam or neutral atomic beam implantation of lead ions or atoms onto the prepared surface. Similarly, because of the costs and control provisions of beam implantation, after the first lead has been placed there may be a follow-up plasma arc spray coat (or even sputtering) placement of lead onto the implanted atoms. Still further, simple flame spraying or charged atom deposition techniques may be employed to place lead or especially to increase the amount of lead emplacement on the prepared surface.

Indeed, it may be preferred for lead to be placed on the prepared substrate surface first by ion implantation—by which monatomic lead is placed on the substrate. Lead may then be further placed by plasma arc spraying, and if necessary by co-extruding, which may then permit alloying of the lead surface. At the same time, particularly with co-extrusion, surface treatment such as by the use of embossing rollers may be effected.

All of the above placement of lead onto the surface of a substrate has its intent to provide a graded junction between the lead and the substrate, by which a gradual concentration ranging from essentially pure substrate material to essentially pure lead, across the junction, will be obtained. Clearly, by removing the discrete chemical interface between the substrate and the coating, the opportunity for direct passivation of the substrate, and for corrosion of the plating, is significantly reduced. This is because the barrier height within the junction is not characteristic of either passivation or corrosion reactions. Therefore, the delamination between the lead coating and the core may be virtually precluded. This fact may be even further enhanced by the introduction of additional atomic species such as tin, antimony, or other additives that are well known to those skilled in the art.

Still further, more sophisticated environments may be provided by the introduction of gas suppression components such as cadmium, or even by high energy binding sites that may come as a consequence of the inclusion of fluorine, as alloying agents with the lead. Normally, the combination of fluorine and titanium is considered to be undesirable; however, when each is present in the range of about 100 p.p.m., the titanium fluorine bond will provide an effective corrosion stop by introducing into the junction area sites that have too high an energy level to be displaced by oxygen.

Following any of the above steps, the layer of lead may be further augmented by extruding yet a further layer of lead onto the already existing placed lead surface. This is then followed, as discussed above, by the surface treating steps, the oxidation steps as applicable to each side of the bipolar plate.

As noted above, a principal object of the present invention is to provide a bipolar battery plate where most of the lead that is found in the plate is active lead. This assures that there is no additional weight due to the presence of unneeded lead. In order to satisfy that criterion, however, it is necessary that an appropriate current collector and support element be provided. Here, appropriate choices for a current collector may be silver, copper or beryllium-copper, for their electrical and thermal characteristics, chrome vanadium steel for its economy as well as for its strength and thermal characteristics, and titanium for its appropriate electrochemical characteristics. Other suitable core element materials that may be chosen might include rhodium in the place of titanium, for example, or other chrome steels such as chrome vanadium steel, chrome molybdenum steel, and chrome steel alloys which include silicon as an alloying element. However, the choice of copper, beryllium-copper, or silver, leads to other difficulties. Specifically, such metals are easily and readily attacked by sulphuric acid, so that any cored bipolar plate which incorporates those materials must be further clad by a metal which is impervious to attack by sulphuric acid. Such a metal is, for example, titanium.

However, it is difficult, if not previously impossible, to adhere or bond lead to titanium in a manner that the interface between the lead and the titanium will maintain its integrity under charge and discharge cycling, or under physical and electrical stress characteristics—such as elevated or very low temperatures, vibration, high current conditions, and so on.

As noted above, therefore, care must be taken that the acid in the lead/acid battery is not permitted to gain access to the silver or to copper, if either is used. Not only will the acid severely destroy the physical integrity of the silver or copper, there will be excessive gas generation within the battery as soon as the acid and silver or copper contact one another. Moreover, as noted above, any attack by sulphuric acid against the core of the bipolar battery plate by which pin holes develop through the core will result in adjacent cells of a bipolar battery being electrically shorted. If a chrome steel is used, it is resistant to the acid but its work function may be so low that gassing will occur when the acid reaches the surface of the steel. Thus, it is important to provide structure whereby a chrome vanadium steel or copper (or beryllium-copper) core are protected by titanium cladding against the acid, and around the edges of the plate not only against the acid but so as to effectively seal the battery.

So as to provide an ideal cored bipolar battery plate with thin lead layers and no excessive lead, the present invention particularly provides for the pre-formed core element to be comprised of a metal having low electrical resistivity. Ideally, that metal is copper, beryllium-copper alloy, chrome vanadium steel, silver, or titanium. However, where copper, beryllium-copper, silver or chrome vanadium steel are used, they must be perfectly clad by titanium at the surfaces of the pre-formed core element which are to face the thin layers of lead at each side of the core.

The bonding or adhering of lead to titanium, or titanium to a substrate such as copper, beryllium-copper, silver or chrome vanadium steel, is another feature of the present invention as discussed below.

It should be noted that the battery industry has previously tried to bond lead to titanium by first providing a titanium ceramic. However, a titanium ceramic is very brittle, so that its structural integrity may be jeopardized even while it is being handled.

The provision of a method to adhere lead to titanium, or titanium to a copper, beryllium-copper, silver or chrome vanadium steel substrate, by creating a gradual junction between the cladding material and its substrate, is described in the referenced co-pending application relating to CORED BATTERY PLATES FOR LEAD/ACID BATTERIES.

The significance of the above criteria must now be discussed. First, as noted, the purpose of a cored plate is to provide a support for the lead or lead oxide active surfaces, to provide a current path or current collector, and in some cases to approximate an isothermal temperature stabilizer. Several typical core materials have been suggested. Copper or beryllium-copper, for example, may be particularly useful when it is desired to provide temperature stability in a battery. The presence of copper will help to equalize temperature as well as current within the battery, preclude the likelihood of hot spots or temperature gradients developing in the battery, as well as to provide a low resistivity current path. In a stacked plate cell, or even in a conventional cell, current flow is along the plate and out the edge of the plate. In a bipolar cell, however, the current flow is through the plate from one side to the other. When the plates are cored plates, the core may contribute to better current handling properties for the plates. However, when the plates are in a lead/acid battery, the materials used in the core may be subject to attack by the sulphuric acid electrolyte.

Titanium and rhodium are immune to sulphuric acid. Copper, beryllium-copper, or even silver, will dissolve very readily and quickly if contacted by sulphuric acid. Also, chrome vanadium steel and, to some extent, the other chrome steels while being acid resistant may have a surface work function which is far too low, and therefore gas may evolve at their surfaces notwithstanding their acid resistant properties. On the other hand, as noted above, there may be some very good reasons for wishing to use copper or some of those other materials in the core, which reasons relate not only to current and heat conductivity characteristics but as well as to the expense of the material. Titanium has a higher electrical resistivity than copper, it is not as good a heat conductor as copper, and it is more expensive. However, as noted, titanium will not be attacked by sulphuric acid so as to dissolve in the acid.

Titanium may be clad to copper by any cladding system or method such as plating, and so on. The referenced co-pending application entitled CORED BATTERY PLATES FOR LEAD/ACID BATTERIES provides means to permit cladding of titanium to other materials such as copper, beryllium-copper, chrome vanadium steel, or silver, as well as to permit cladding of lead to titanium or chrome vanadium steel. Thus, methods have been otherwise provided for material cladding by which a graded junction of the cladding material to the substrate material is provided so as to the thereby substantially preclude any possibility of delamination of the materials under any conditions. In any event, what is provided is a cladded core by which the electrochemical system of the battery may be protected by precluding unwanted gas evolution, dissolution of core material into the acid electrolyte, by providing acceptable current handing and electrical resistance properties, and by providing temperature stabilization due to the presence of substantially isothermal plates.

In general, the placement of lead on titanium, or titanium on copper or chrome vanadium steel, for example, is accomplished by first creating a graded junction using ion implantation techniques. The ion implantation techniques may also include neutral atom embedment techniques. By these means, an ion or atom stream of the cladding metal is directed towards the surface of the substrate metal. The impact of the cladding metal on the substrate metal is important and is a function of the initial kinetic energy. Thus, the ion bombardment or neutral atom embedment characteristics, as a function of initial kinetic energy, may be controlled by controlling the acceleration voltage between the source and the target. Thus, with an initial high acceleration voltage, the ions of the cladding material will initially impact the substrate material and be deeply embedded thereinto. Then, the acceleration voltage may be gradually reduced so that there will be less impact and therefore a layer of implanted metal will be developed. Thereafter, there may be a plasma spray of the cladding material. When the material being clad is lead onto titanium, then further lead may thereafter be co-extruded onto the, by then, exposed lead surface. By co-extruding lead onto the surface, a lead alloy can be put into place; it being understood, of course, that ion implantation of any metal is generally monatomic as to that metal, for any one gun being used.

However, it must be clearly understood that when a lead to titanium graded junction has been established, that junction must not be permitted to be re-alloyed or otherwise disturbed. In any event, a usual procedure would be for about 200 atoms thick of ion implantation to first be placed of lead into titanium, followed by up to 2000 atoms or so of plasma torch cladding. Thereafter, a layer or multiple sequential layers of lead which may be millions of atoms thick may be extruded or cast onto the lower surface. Optionally, the relatively thin layer of lead, even if it is millions of atoms thick, may be placed by sputtering or flame spraying lead onto the lower surface. If an extrusion process is carried out, it must be at a relatively low temperature so as not to disturb the graded lead/titanium junction, and be quenched to further reduce disturbance.

Moreover, it must be noted that even the initial placement of lead may have a small concentration—up to 100 p.p.m.— of fluorine alloyed with it. It may also be possible for additional tin and/or cadmium, where the tin may be present in a range of up to 1% and with lower concentrations of cadmium, on the lead side of the junction. The cadmium may then function as a gas suppressant, and the tin will function as an anti-corrosion agent.

Indeed, after a lead surface has been established over a titanium substrate, it is possible to anneal the lead surface; for example, such as by photon absorption from infrared sources. Thereafter, a further layer may be placed such as by plasma torch spraying or extruding, and then the structure may be annealed again at a lower temperature than previously. Thus, repetitive annealing steps may take place at ever decreasing temperatures as the thickness of the lead increases, until a substantially pure annealed lead surface— or at least a surface having a desired lead alloy composition, and a desired layer depth profile—is achieved. Surface treating steps, as discussed previously, may be carried out.

Finally, the cored battery plate as it is now constituted following processes according to the preceding discussion may then be assigned for use in a bipolar lead/acid battery. Thus, the opposed sides of the cored plate will be differently treated, so that one side of the plate is the negative plate and the other side of the plate is the positive plate in a bipolar battery.

FIG. 1 depicts a cored, bipolar lead/acid battery 20 according to the invention. The battery 20 features a bipolar plate 22 comprising a core element 24, with positive surface 28 and negative surface 26 disposed respectively on each side of the core 24. The positive surface 28 is lead oxide and the negative surface 26 is lead. The positive and negative surfaces 28 and 26 respectively face unipolar, negative and positive end surfaces 32 and 34 respectively. A molded polymer frame 30 is placed around the edges of the bipolar plate 22 and electrolyte located in the liquid tight compartments 36 and 38 between the end surfaces 32 and 34 to form the battery 20.

A small pipe gas conduit 40 and a pressure relief valve/ nipple 42 are provided together with the frame 30, generally placed at the negative side of each cell, to permit venting of gas upon gas buildup in the cell beyond a predetermined pressure level.

Typically, the thickness of lead will vary depending on the use to which the plate is to be intended. For example, the thickness of lead cladding on the negative side of a bipolar plate, or on both sides of a cored plate intended for use as a negative plate, may be in the range of 0.5 to 1.0 mm. The positive side will have approximately 1.0 to 1.5 mm of lead cladded on the plate—or the positive side of the plate— which will subsequently be oxidized. Such values are typical for batteries which will be utilized such as for electric vehicle propulsion, where the batteries must accept and give up charge quite rapidly. Indeed, for batteries that are high use, low power, high energy density batteries such as those used for camcorders, laptop computers, and the like, the thickness of the active layers may only be 0.5 turn at each side of the plate.

Standards for the lead/acid industry at this time are generally such that plate thicknesses of 2.0 mm are considered to be thin, whereas plate thicknesses of 5.0 mm to 7.0 mm are considered to be thick. Indeed, under current industry standards, plates of 7.0 mm up to or exceeding 10.0 mm for standby batteries are to be found in the field. Bipolar batteries having cored plates according to the present invention, will, as noted, have very thin active layer thicknesses and reduced plate thickness. Even standby batteries in keeping with the present invention will have only 1.0 mm to 1.5 mm thickness of lead on the negative side, and 1.5 mm to 2.0 mm thickness of lead oxide on the positive side of the bipolar plates. Thus, bipolar batteries in keeping with the present invention are capable of being brought to the market and to the users with little or no excess lead, whereby almost all of the lead in the battery is usable.

Indeed, bipolar batteries whose principle purpose is high use, low power batteries having high power densities—high watts delivered per kilogram of weight—are also to be provided by the present invention. Such batteries may, for example, be used in camcorders, lap-top computers and the like. In those cases, the bipolar battery plates may be provided having a titanium foil with approximately 0.5 mm active layers on either side of the foil.

Finally, for bipolar batteries where a plurality of cells are stacked, there is a likelihood that especially when the battery is being recharged there may be gas produced in each of the cells of the battery. Still further, there is the necessity to assembled the bipolar battery. The present invention provides for assembly of bipolar batteries, and permits venting of the battery cells in the manner described below.

Usually, before any surface treatment of the lead at either side of the bipolar plate will occur, or even before the lead is placed on the core, the edges of the plate are first masked with a strippable masking agent. That masking agent must be such that it can later be removed. Thus, the masking agent can be such as a masking tape or a peel-off coating, or an epoxy or other agent that can be removed by being dipped in a solvent which will otherwise not affect the lead or lead oxide active surfaces of the plate.

Following production of the lead or lead oxide active surfaces of the plate, the bipolar battery must then be assembled. This is accomplished, of course, by placing a number of bipolar plates in juxtaposed relation one to another in such a manner as to form a battery container or confinement. The battery must, of course, otherwise then comprise suitable separators or other means to confine the electrolyte generally in place, together with the electrolyte and sealing means as discussed hereafter.

After both active surfaces of the bipolar plate have been fabricated, the masking agent is stripped from the edges of the bipolar plate and a plastic frame is molded or placed around the edges of the plate. Suitable materials for that plastic frame are any moldable polymer material which will be unaffected by sulphuric acid, and provide a liquid tight seal. KAPTAN™, Kel-F™, PTFE, TFE, or TPE, are particularly acceptable because those materials are ones which may be used in high pressure molding. Such materials are, in any event, the sort that will be useful in compression transfer molding techniques because of the manner in which the bipolar plate is assembled.

A plurality of similar bipolar plates having plastic frame members around the edges thereof, with interleaved separators containing the required electrolyte, are then assembled into a liquid tight battery compartment using appropriate bonding procedures to adjoin the adjacent plastic frame members. Such bonding procedures may be high pressure molding, high temperature or other thermal bonding procedures, ultrasonic techniques, or even the use of appropriate solvents. In any event, the battery will thereby be assembled. Of course, in general, substantially similar but unipolar positive and/or negative plates will also be assembled at the outer ends of the battery stack, so as to thereby have an equal number of facing positive plates and negative plates within the battery. Moreover, large area, low resistance contacts that are equal to the plate area of the battery plates are thereby provided.

Indeed, the plastic flames provided for the battery plates may be such that they extend beyond the edges of the plates, so as to form an electrolyte reservoir volume having a projected area larger than the plates. Moreover, each cell of the bipolar battery may be vented by placing an extended nipple and a pressure relief valve together with the frame member. Generally, a small pipe or gas vent is molded at one side of the frame, and then a molded polymer or silicon rubber cap is placed over the thus-provided gas conduit. The vent itself is quite conventional, otherwise.

In general, the cell vents for each cell in the bipolar battery are placed at the negative side of each cell—in other words, in the frame which is molded around the bipolar plates at the negative side of each bipolar plate. Thus, a sealed battery structure wherein electrolyte is sealed and confined but which may be vented as to gas production in the battery, especially during discharge, is provided. Venting will usually occur after there has been a gas pressure buildup beyond a predetermined pressure level, as may be defined by the design of the vent elements.

To assure that the edges of each of the bipolar plates will be liquid tight when the battery is assembled, it may be appropriate to deform the edges of each plate prior to placing the mask on the edges. The edge deformation of the plates may be carried out such as by forming tipples or fibs into the plate edges.

In some circumstances, it may be desirable to alloy the thin layer of lead that is formed in the battery plates in keeping with the present invention. An agent such as calcium or antimony may, for example, be alloyed with lead as it is extruded onto the plate structure. It may also be desired that lignin, which is derived from Norway pine and which is used as an expander, may be sprayed onto the plates if needed. If so, the lignin would be dissolved in an organic solvent such as benzene or acetone.

Finally, while it is outside the scope of the present invention to consider the charging of batteries in various service requirements, it must be noted that the battery charger, and the system comprising the charger and the battery, may be optimized so as to fully exploit the advantages of cored plate batteries. For example, where long series strings of batteries are provided for charging, the charging system would include provisions for balancing the voltage of the batteries so as to prevent the formation and evolution of differential battery states. Similarly, in long term stand-by battery systems, not only must the chemistry of the battery in terms of its plate and electrolyte composition be optimized, there must also be provided a charger environment which takes into account stratification, local inhomogeneities, dendrite growth within the batteries, etc. Even further, battery history, as well as the separator structure, the filled volume of the batteries, the case materials from which the batteries are constructed, and even the vent pressures at which the batteries will vent, may be considered and designed for. Thus, it is possible to exceed the performance limit of conventional designs by constructing and designing batteries and their chargers that will be optimized for a given requirement.

There have been described methods for fabricating bipolar lead/acid batteries. The bipolar plates of the present invention comprise a core which, because of the exposure to sulphuric acid electrolyte, will either comprise titanium, or titanium clad onto a further high heat conductivity, low electrical resistivity metal such as copper. In any event, a graded junction is provided between the titanium and the lead, whereby any chance for delamination of the lead away from the titanium surface which it faces is substantially precluded. The assembly of bipolar batteries in keeping with the present invention, and the provision of the vents for each cell of the bipolar battery, have been discussed. The scope of the present invention is defined by the appended claims.

What is claimed is:

1. A bipolar lead/acid battery having at least one cored bipolar battery plate;

wherein said bipolar battery plate comprises a core element having an active surface at each side thereof, wherein the active surface at the negative side thereof is essentially lead and the active surface at the positive side thereof is lead oxide;

wherein said core element comprises titanium at least at each surface thereof which faces the respective lead and lead oxide active surfaces, wherein the core element of said bipolar plate comprises a preformed core of low resistivity metal selected from the group consisting of copper, beryllium-copper alloy, chrome vanadium steel, and silver, and where titanium is clad over said low resistivity metal; and wherein a molded polymer frame is provided around said at least one bipolar plate, and negative or positive end plates are provided opposite the outermost positive or negative sides of the at least one bipolar plate so as to provide a functioning battery structure;

whereby said bipolar lead/acid battery is sealed against electrolyte leakage therefrom and wherein electrolyte is confined within the bipolar battery structure by the battery frame surrounding said at least one bipolar plate.

2. The bipolar lead/acid battery of claim 1, wherein the polymer material is selected from the group consisting of KAPTAN, Kel-F, PTFE, TFE and TPE.

3. The bipolar lead/acid battery of claim 2, a gas conduit and vent are provided together with said battery frame so as to permit pressurized gas to flow from said battery.

* * * * *